Nov. 5, 1935.          H. W. LEE          2,019,985
                          LENS
                   Filed Dec. 26, 1930
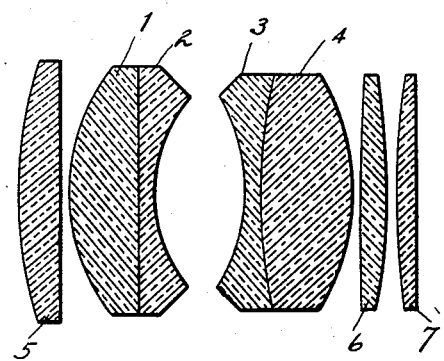
INVENTOR
Horace William Lee
BY
Arthur L. Kent
his ATTORNEY Patented Nov. 5, 1935

2,019,985

UNITED STATES PATENT OFFICE 2,019,985

LENS

Horace William Lee, Leicester, England, assignor to Kapella Limited, Leicester, England, a corporation of England Application December 26, 1930, Serial No. 504,944

10 Claims. (Cl. 88—57)

This invention relates to photographic lenses consisting of a pair of meniscus dispersive members with their concave surfaces facing one another, placed between outer collective members, and the object of the invention is to provide an improved objective of large aperture and field of view.

A lens system of this type was described e. g. in the specification of British Letters Patent No. 157,040, having an aperture of f/2 and field of view of 50° or more, in which the collective members (between which the dispersive members were placed) were simple meniscus lenses. In the present invention, I make one of the collective members, preferably the rear one, of two simple elements, whereby I am able to construct my system at a larger aperture, viz. f/1.4 or more, with a flat field corrected for spherical and chromatic aberrations, coma, distortion, and astigmatism. I make in each of the two rear simple collective lenses the curvatures unequal, one being at least three times that of the other, and the two lenses are so placed that the more deeply curved surfaces face one another.

The annexed drawing is a sectional drawing through the axis of a lens of one inch focal length, made according to the present invention, having an aperture of f/1.4. In the drawing 1 and 2 are the components of one of the dispersive members, and 3 and 4 the components of the other dispersive member. The lens 5 constitutes the front collective member and the lenses 6 and 7 the components of the rear collective member.

The specific details of the lens system illustrated are given in the table below, wherein the first set of figures relate to the left-hand component, and the last to the right-hand component, and so forth.

| Radii | Thickness | Separation | Refractive index for the D-line | $V=\frac{{}^nD-1}{{}^nF-{}^nC}$ |
|---|---|---|---|---|
| Plus 0.9<br>Plus 6.1 | .15 |  | 1.6135 | 59.4 |
|  |  | .005 |  |  |
| Plus 0.44<br>Minus 1.65 | .175 |  | 1.6135 | 59.4 |
| Plus 0.307 | .02 |  | 1.579 | 40.4 |
|  |  | .195 |  |  |
| Minus 0.350<br>Plus 3.8 | .02 |  | 1.579 | 40.4 |
| Minus 0.523 | .21 |  | 1.6437 | 48.3 |
|  |  | .005 |  |  |
| Flat<br>Minus 1.12 | .08 |  | 1.6135 | 59.4 |
|  |  | .005 |  |  |
| Plus 1.74<br>Flat | .06 |  | 1.6135 | 59.4 |

In the above table, radii are in inches and considered plus when convex to the incident light. $^nD$ is the refractive index for the sodium D line; $^nF$ is the refractive index for the hydrogen blue line, and $^nC$ is the refractive index for the hydrogen red line.

The above figures are, of course, merely illustrative of the invention and components having different radii, thickness, separation, refractive index and V from those above given may be employed.

What is claimed is:

1. Large aperture lens system for photography and the like, comprising two meniscus dispersive members placed with their concave surfaces facing one another and two collective members arranged respectively in front and behind said dispersive members, one of the collective members consisting of two simple elements.

2. Large aperture lens system for photography and the like, corrected for spherical and chromatic aberrations, coma, distortion, astigmatism and curvature of the field, comprising two meniscus dispersive members each of two components, such members being placed with their concave surfaces facing one another, and two collective members arranged respectively in front and behind said dispersive members, the collective member nearest the image consisting of two simple elements.

3. Large aperture lens system for photography and the like, as claimed in claim 2, in which each of the simple elements forming the member nearest the image has the radius of one surface at least three times as great as the radius of the other surface.

4. Large aperture lens system for photography and the like, as in claim 2, in which the simple elements forming the member nearest the image are placed so that the surfaces with the shorter radii face one another.

5. Large aperture lens system for photography and the like, as in claim 1, in which the maximum effective aperture is greater than f/2 and the air spaces between the said members are all small.

6. A photographic lens, comprising two meniscus dispersive members placed with their concave surfaces facing one another, and two collective members arranged respectively in front of and behind said dispersive members, one of said collective members consisting of two simple elements, all of said members cooperating as constituent parts of a single lens to produce an image corrected for spherical and chromatic aberrations, coma, distortion, astigmatism and curvature of the field.

7. A photographic lens as in claim 6, in which the maximum effective aperture is greater than f/2.

8. A photographic lens, consisting solely of two meniscus dispersive members placed with their concave surfaces facing one another, and two collective members arranged respectively in front and behind said dispersive members, one of the collective members consisting of two simple elements.

9. A photographic lens, consisting solely of two meniscus dispersive members each of two components, such members being placed with their concave surfaces facing one another, and two collective members arranged respectively in front and behind said dispersive members, the collective member nearest the image consisting of two simple elements, each of such simple elements having the radius of one surface at least three times as great as the radius of the other surface, such simple elements being arranged so that the surfaces with the shorter radii face one another, all of said members cooperating as constituent parts of a single lens having a maximum effective aperture in excess of f/2 to produce an image corrected for spherical and chromatic aberrations, coma, distortion, astigmatism and curvature of the field.

10. Large aperture lens system for photography and the like, comprising two meniscus dispersive members each of two components, such members being placed with their concave surfaces facing one another, and two collective members arranged respectively in front and behind said dispersive members, the collective member nearest the image consisting of two simple elements.

HORACE WILLIAM LEE.